United States Patent [19]

Kirschner

[11] 3,816,005
[45] June 11, 1974

[54] HEAD-UP DISPLAY

[75] Inventor: Robert K. Kirschner, Bellevue, Wash.

[73] Assignee: Sundstrand Data Control, Inc., Redmond, Wash.

[22] Filed: July 14, 1972

[21] Appl. No.: 271,983

Related U.S. Application Data

[63] Continuation-in-part of Ser. No. 48,148, June 22, 1970, abandoned.

[52] U.S. Cl.................. 356/251, 350/174, 350/294
[51] Int. Cl. ........................................... G02b 23/10
[58] Field of Search.................. 350/174, 198, 294; 35/12 N; 356/251, 252; 248/479

[56] References Cited
UNITED STATES PATENTS

| | | | |
|---|---|---|---|
| 2,482,115 | 9/1949 | Laird | 350/174 X |
| 2,490,747 | 12/1949 | Creighton | 356/251 |
| 3,203,328 | 8/1965 | Brueggemann | 350/294 |
| 3,229,576 | 1/1966 | Rees | 350/198 |
| 3,261,912 | 7/1966 | Hemstreet | 35/12 N |
| 3,367,046 | 2/1968 | Neuberger | 35/12 N |
| 3,432,219 | 3/1969 | Shenker et al. | 350/198 X |
| 3,446,916 | 5/1969 | Abel et al. | 356/251 UX |
| 3,503,146 | 3/1970 | Woplin | 350/174 UX |
| 3,511,465 | 5/1970 | Morion | 248/479 |
| 3,547,522 | 12/1970 | Schaefer | 350/174 |
| 3,552,828 | 1/1971 | Lawrence et al. | 350/174 |
| 3,574,283 | 4/1971 | Albers | 350/174 |

OTHER PUBLICATIONS

La Russa, "Visual Spaceflight Simulators," Optical, Sept./Oct. 1969, pages 58–63.
Display System Engineering, edited by H. R. Luxenberg and R. L. Kuehn, McGraw-Hill 1967, pages 205–209.

Primary Examiner—David Schonberg
Assistant Examiner—F. L. Evans
Attorney, Agent, or Firm—Hofgren, Wegner, Allen, Stellman & McCord

[57] ABSTRACT

An apparatus for displaying collimated images including an ellipsoidal mirror having a focal surface and means for generating a bar and scale image for the mirror in the focal surface. The means generating a scale image includes an elongated strip of film or tape containing indicia which is positioned intermediate an elongated light source and the mirror to display a scale image on the mirror, and the means generating the bar image includes a transverse bar which reflectively defines a bar image on the mirror intersecting the scale image. The generating means includes means for moving the tape strip to modify the scale image and means for moving the bar to displace the bar image on the mirror and modify the position of intersection between the bar and scale images.

21 Claims, 23 Drawing Figures

HEAD-UP DISPLAY

BACKGROUND OF THE INVENTION

This application is a continuation-in-part of my application Ser. No. 48,148 filed June 22, 1970, now abandoned, and assigned to the assignee of this application.

This invention relates to an apparatus for displaying collimated images on a mirror.

The use of an image source to display an image on a mirror is well known in the art. In devices of this type, such as head-up displays and gun sights, a partially reflective mirror has often been utilized to combine the displayed image with the view of a vehicle operator through the mirror. For various applications of the displays, it has been recognized that collimation of the displayed images produces advantageous results for the viewer. By making the reflected light rays parallel to each other, the images are clearly visible to the operator and appear to be projected on a distance object on which his eyes are focused, since the images are focused at infinity. In addition, the collimated images do not appear to move relative to the distant object when the viewer moves his head.

However, in order to effect collimation these displays have usually placed a collimating lens between the image source and the mirror. Lenses of this sort have generally been of a refractive type to collimate diverging light rays from the image source into parallel rays, and the rays are then reflected from a flat combining mirror to the viewer. A number of difficulties have been encountered in the use of such collimating devices. Since the light rays passing from the collimating lens to the mirror are parallel to each other, it is necessary to have a lens at least as large in area, measured perpendicular to the optical axis, as the projected image display area on the combining mirror. Frequently, these displays are used where space is at a premium. For example, head-up displays are often mounted in the cockpit of an aircraft in front of a pilot, and severe space limitations in the cockpit have prevented the use of relatively large image generating sources. Consequently, the size of the collimating lenses have been limited, and the corresponding size of the collimated image display has necessarily been minimized.

In addition, cockpit space limitation has dictated that the focal length of the collimating lens be relatively short to minimize both the distance between the image sources and the lens and the size of the image source, in order to reduce the bulk of the image source. It is known that lenses having short focal lengths require multiple precision elements to compensate adequately for spherical and chromatic aberration, and such assemblies are both heavy and costly. As an example, a head-up display having a refractive 4 inch collimating lens with a short focal length could not be placed in most cockpits without a major redesign, and the corresponding 4 inch image display is inadequate for many present applications.

The displays which use collimating lenses have been found particularly impractical when viewed by both eyes. Due to the distance of eye separation, only a small center portion of the collimated display can be viewed simultaneously by both eyes, and for a circular collimating lens the restricted portion of the circular display, which is simultaneously viewed by both eyes, is even more narrow above and below the center of the display area. Thus, in head-up displays relatively small cross winds can move the collimated display to a position where it is visible to only one eye when the eyes of the operator are fixed on a reference point, such as a runway. Under such conditions, if the size of the mirror conforms to the size of the collimated display, one of the operator's eyes may be viewing the reference point completely off the edge of the mirror.

In order to alleviate these problems spherical and parabolic mirrors have been used to collimate the images, and the collimating lenses have been eliminated. Although some satisfaction has been achieved, it has been determined that with the systems which have been used, both of these mirrors are undesirable for viewing with two eyes. Parabolic mirrors do not have a focal plane surface which is symmetrical about the optical axis for off axis viewing by both eyes and do not have a focal surface which is common for both eyes of the viewer. Accordingly, parabolic mirrors do not provide clear viewing of the image display by both eyes and have been found unacceptable where two-eye viewing is desired.

In relatively small size reflective systems, as used in a head-up display for an aircraft for example, the spacing between the eyes of the viewer and the distance the viewer's eyes are removed from the optical axis of the combining mirror are significant as compared with the focal length of the combiner. (The focal length or distance from the combiner surface to the focal surface may be used as a measure of the "size" of the system.) Unless the combiner geometry and the relative locations of the image generator and the viewer's eyes are properly correlated, a split image phenomenon is observed since the right and left eye images are not superimposed over the entire field of view. This problem is particularly acute in the vertical direction as a vertical disparity of this character is not encountered in nature and the viewer cannot readily accommodate to a vertical split image. A small lateral disparity may be more readily tolerated, as it is interpreted by the viewer as a measure of the distance to the image.

SUMMARY OF THE INVENTION

The present invention eliminates the above problems associated with producing a collimated image display by providing a display apparatus which utilizes an ellipsoidal mirror which has focal surfaces for each eye which are practically coextensive, and by generating images for the mirror in the focal surface thereof. The ellipsoidal mirror collimates the images without the necessity of a collimating lens, and permits a relatively large area of image display on the mirror. The focal surface of the ellipsoidal mirror has a surface which is sufficiently symmetrical about the optical axis to provide a clear view of the collimated images by both eyes of the viewer.

The display apparatus includes a base having a housing which contains means for generating the images and which has a front window through which the images are directed toward the mirror. The base has a portion extending forwardly from the housing below the mirror, and the mirror is mounted on the end of the second portion remote from the window. The generating means includes means for generating a scale image on the mirror which has a light source positioned in a translucent tape guide with an elongated guide surface facing the mirror. An elongated strip of tape containing a plurality of indicia is movably supported against the guide surface to display a plurality of scale indicia on the mirror. The generating means also includes means for generating a bar image on the mirror which has a transverse elongated bar and an elongated light source aligned with the bar, light reflected from the bar defining a bar image on the mirror. The bar is movable in a plane which is generally parallel to the face of the mirror to displace the bar image on the mirror, and the lamp source is aligned with and adjacent to the plane of bar movement. Circuit means energizes the scale and bar lamps and modulates the light intensity.

A feature of the invention is that the elongated tape defines an elongated scale image on the mirror which is modified by movement of the tape.

Another feature of the invention is that the bar image intersects the scale image on the mirror to indicate a relationship between the images.

A further feature of the invention is that movement of the bar displaces the bar image on the mirror and changes the point of intersection between the bar and scale images.

Yet another feature of the invention is that the bar and tape strip are positioned in the focal surface of the ellipsoidal mirror.

Still another feature of the invention is that the guide surface and bar are curved to generally conform with the shape of the focal surface.

A feature of the invention is that the ellipsoidal mirror is a segment of a surface of revolution of an ellipse about its major axis.

Another feature of the invention is that the ellipsoidal mirror is partially-reflective and positioned in the line of vision of a vehicle operator, and the collimated images are combined with the view of the operator through the mirror.

A feature of the invention is that the mirror is slidably mounted to the second base portion to adjust the mirror relative to the bar and film strip and to locate the generating means in the focal surface of the mirror.

Another feature of the invention is that the mirror is pivotally mounted to the second base portion to fold the mirror between an upright position with the mirror displaying the image and a stow position with the image removed from the mirror.

Still another feature is that switch means which is operably associated with the pivotally mounted mirror, closes the circuit means and energizes the lamp sources when the mirror is in the upright position and opens the circuit means and deenergizes the lamp sources when the mirror is in the stow position.

The display apparatus has means for regulating the light intensity of the displayed images including a pair of light sensors, and has means responsive to the light sensors to control the current to the lamp sources and the intensity of the images.

A feature of the invention is that one of the light sensors measures the ambient light condition of the view through the mirror, and the second light sensor measures the light from the image light source, and the sensor outputs are compared to regulate the contrast of the displayed image with the ambient light condition.

Another feature of the invention is that the regulating means includes means to adjust the light transmitted to one of the sensors to modify the degree of contrast between the image and the ambient light condition.

A further feature is that the display apparatus provides for a second mirror to reflect the collimated images from the ellipsoidal mirror.

A support device is provided for mounting the display apparatus to a vehicle. The support device has a bracket secured to the vehicle and linkage means pivotally securing the base to the bracket.

A feature of the invention is that the support device permits movement of the display apparatus between a viewing position with the mirror interposed in the operator's normal line of vision and a position with the mirror removed from the operator's vision.

Further features and advantages of the invention will readily be apparent from the following specification and from the drawings, in which:

DETAILED DESCRIPTION OF THE INVENTION

Figures 2, 3, 4, 5:
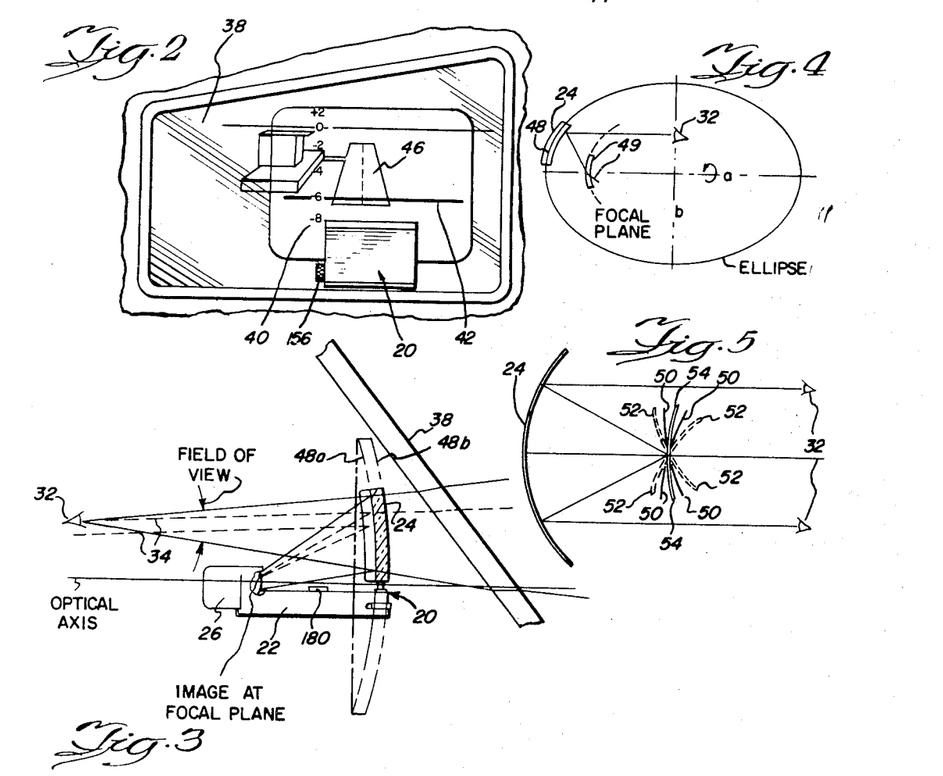
FIG. 2 is a fragmentary perspective view of the display apparatus of this invention mounted in an aircraft, and showing a flight path bar directing the pilot to a landing approach on a runway.
FIG. 3 is a diagrammatic view showing the relationship between the generating means, the ellipsoidal mirror and the viewer.
FIG. 4 is a diagrammatic view showing the relationship between the revolved ellipse, the viewer and the generating means.
FIG. 5 is a diagrammatic view showing the relationship of the focal surfaces of various collimating mirrors to the eyes of the viewer.
Figures 6, 7, 8:
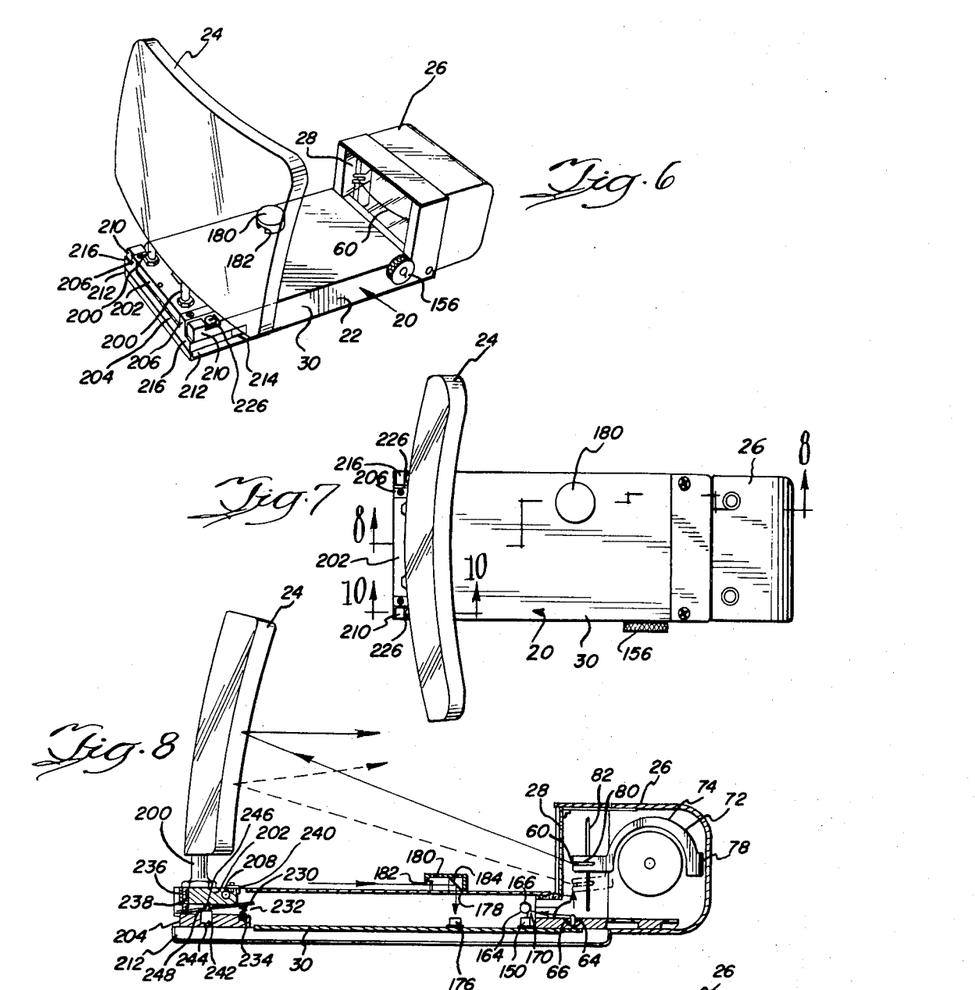
FIG. 6 is a perspective view of the display apparatus of the present invention.
FIG. 7 is a plan view of the display apparatus of this invention.
FIG. 8 is a section along the line 8—8 of FIG. 7, with the mirror in an upright position.

Referring now to FIGS. 3 and 6, a display apparatus generally designated 20 is shown having a base 22 and a mirror 24. The base 22 has a housing 26 with a front window 28, and a second portion 30 extending forwardly from the housing 26 below the window 28. The mirror 24 is mounted to the second base portion 30 adjacent the end of the second portion which is remote from the window.

Images for the mirror are generated in the housing 26, directed through window 28, and reflected from the mirror to the eyes 32 of a viewer. The reflected light rays 34 are generally parallel to each other in order to collimate the images, as described in detail below. In a preferred embodiment of the invention, the mirror is sufficiently transparent to provide the viewer unobstructed vision through the mirror, and the displayed images are combined with the view through the partially reflective mirror.

Figure 1:
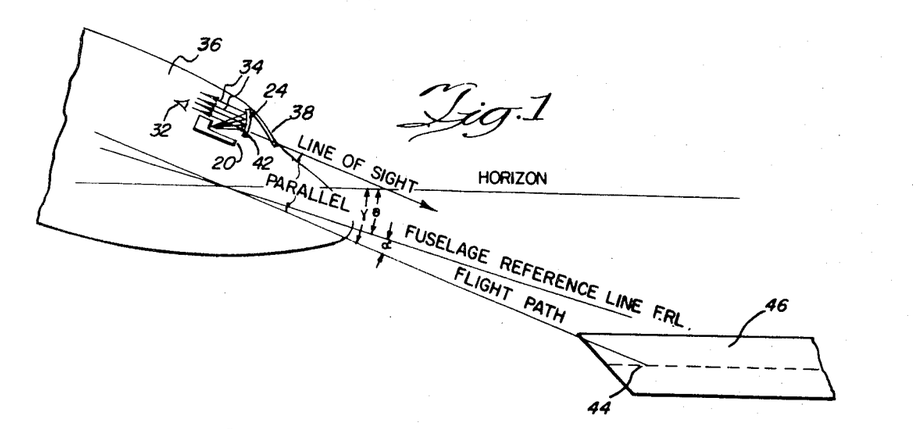
FIG. 1 is a diagrammatic view of the display apparatus as used in an aircraft and showing the relationship between the aircraft flight path and a runway during landing approach of the aircraft.

In one particular application of the display apparatus, commonly termed a head-up display, the display is mounted in the cockpit of an aircraft 36, as illustrated in FIGS. 1 and 2, and the mirror 24 is positioned in the pilot's normal line of sight through the aircraft windshield 38. The images displayed on the mirror are indicative of aircraft information, and the images may include a vertically orientated scale 40 and a transverse bar 42 which intersects the scale image 40. As described below, the scale image is vertically movable on the mirror to change the reference of the scale indicia relative to the bar 42, and the bar moves up and down in accordance with the aircraft angle of attack to change the point of intersection between the bar and scale images and guide the pilot in following a desired flight path to a touchdown point 44 on a runway 46.

Since the images are collimated, they are optically focused at infinity and appear clearly focused to the pilot whose eyes are focused at optical infinity or the distant field. Accordingly, the collimated images appear to be projected on the pilot's view of the field, they remain fixed with respect to his distant view when his head moves relative to the mirror.

The aircraft angle of attack $\alpha$, FIG. 1, is defined as the angle between the fuselage reference line FRL and the aircraft flight path, the aircraft pitch angle $\theta$ as the angle between the fuselage reference line FRL and the horizontal, and the aircraft flight path angle $\gamma$ as the angle between the horizontal and the direction of aircraft flight path. The angles are related by the expression $\gamma = \Delta + \theta$.

The display apparatus is arranged to modify the angle of reflected parallel rays 34 of the bar image 42 as a function of aircraft angle of attack $\Delta$ and maintain these rays generally parallel to the aircraft flight path. Consequently, the pilot's line of sight through the bar 42 is parallel to the actual aircraft flight path, and the bar indicates the projected flight path for the aircraft.

If the pilot controls the aircraft 36 in a manner maintaining the bar 42 in his line of vision on the aim point 44 near the end of the runway 46, the aircraft will be directed along that path to the aim point.

The display apparatus is arranged to move the scale image 40 vertically on the mirror as a function of aircraft pitch angle $\theta$, and the zero indicia of the scale is referenced to the distant horizon. The point at which the bar image 42 intersects the scale 40 indicates to the pilot the aircraft flight path angle $\gamma$, which is read directly from the scale.

The signal which drives the bar may be modified as, for example, disclosed in Bateman et al Ser. No. 42,918, filed June 3, 1970, and Bateman U.S. Pat. No. 3,654,806, issued Apr. 11, 1972.

In order to collimate the images for the viewer, the mirror 24 in the display apparatus of the present invention has an ellipsoidal shape, and the images are generated in the focal surface of the mirror. As illustrated in FIG. 3, light from the image sources in housing 26 passes directly to the mirror, and the shape of the ellipsoidal mirror transposes the reflected light into the parallel rays 34. Thus, the collimating mirror eliminates the necessity of having a collimating lens between the image sources and mirror, and the limitations imposed on the size of the displayed images due to the collimating lenses are removed. Accordingly, a larger area of image display is permitted with a smaller overall unit size than was possible through the use of collimating lenses. For example, in FIG. 2 the bar 42 is given a substantial horizontal dimension to permit simultaneous vision of the bar by both eyes of the pilot, and to show the relationship of the bar to the aim point during yaw movement of the aircraft due to cross winds.

A mirror approximately 3.3 inches high and 7.2 inches wide has been used. When viewed at a distance of 18 inches from the mirror, the horizontal field of view for separate eye viewing is 15° on each side of the center through the mirror, and the field of view for both eyes is 7.3° on each side of center. The field of view for both eyes is adequate for normal conditions of cross-wind landings and pilot head movement.

As illustrated in FIG. 4, the shape of the ellipsoidal mirror is preferably obtained by revolving an ellipse about its horizontal axis $a$, and taking a segment of the surface of revolution 48 of the revolved ellipse adjacent the axis of revolution and wholly in one hemiellipsoid. In FIG. 3, the mirror 24 is shown as a segment of a pair of closely spaced ellipsoids 48a and 48b, with both surfaces of the revolved ellipses partially shown in dotted lines. Thus, both the front and rear surface of mirror 24 may be ellipsoidal, particularly if the mirror is partially reflective.

As shown in FIG. 4, image sources 49 are positioned in the focal surface of ellipsoidal mirror 24 to generate images for the mirror. The collimated images are reflected from the mirror generally parallel to and displaced from the horizontal axis $a$ of the revolved ellipse, and the images are generated about the axis $a$. The collimated images are preferably viewed from a position on the vertical axis $b$ of the ellipse. In the illustrative diagram the eyes 32 of the viewer are spaced from the axis $a$ approximately 0.135 times the semi-vertical axis $b/2$. The ratio of axis $a$ to axis $b$ illustrated is of the order of 4:3, and in a particular case 1.29 has been used for the value of $a/b$.

As an example of the ellipsoidal mirror in which excellent results have been achieved, the distances for the major and minor axes of the ellipse have been chosen on the order of 40 and 30 inches, respectively. In this example, the focal surface is approximately 6 inches from the surface of the mirror, the reflected images are viewed approximately 20 inches from the surface, and the eyes are spaced from the major axis approximately 2.1 inches.

Although the mirror has been described as an ellipsoid of revolution, it is also contemplated that the mirror may be ellipsoidal in only one direction. For example, if collimation is required in only the vertical direction, the mirror may have an ellipsoidal shape vertically relative to the optical axis, while the horizontal shape may be flat or some other curvature. Such a mirror is a segment of a surface formed by translating the ellipse in a direction at right angles to the plane of the axes.

Spherical and parabolical mirrors have previously been used to collimate images, and FIG. 5 is a diagrammatic plan view of collimating mirrors for simultaneous viewing by both eyes 32, where mirror 24 represents a spherical, parabolical, and ellipsoidal collimating mirror. The shapes of the focal surfaces for the spherical, parabolical, and ellipsoidal mirrors are, respectively, the focal surfaces 50, the focal surfaces 52, and focal surface 54, where the eyes are spaced from the optical axis as shown in FIG. 4. For both the spherical and parabolical mirrors, a different focal surface corresponds to each eye of the viewer, and each of these focal surfaces is unsymmetrical about the optical axis. Consequently, there is no common focal surface for both the spherical and parabolical mirrors which is suitable for viewing by both eyes. On the contrary, the ellipsoidal mirror has a common focal surface 54 for both eyes which is symmetrical about the optical axis, and permits clear vision of the images by both eyes simultaneously. The focal planes 50 for the spherical combiner become coincident if viewed from a location closer to the combiner than indicated in FIG. 4.

For the ellipsoidal mirror, the focal surface is approximately spherical in the area of the axis of revolution, and it is convex toward the surface of the mirror. The spherical focal surface has a radius of the order of one-fifth the semi-major axis, or about $a/10$. In the specific example above, with $a = 40$ inches and $b = 30$ inches, the radius is approximately 4 inches.

Figures 19A, 19B, 19C, 20:
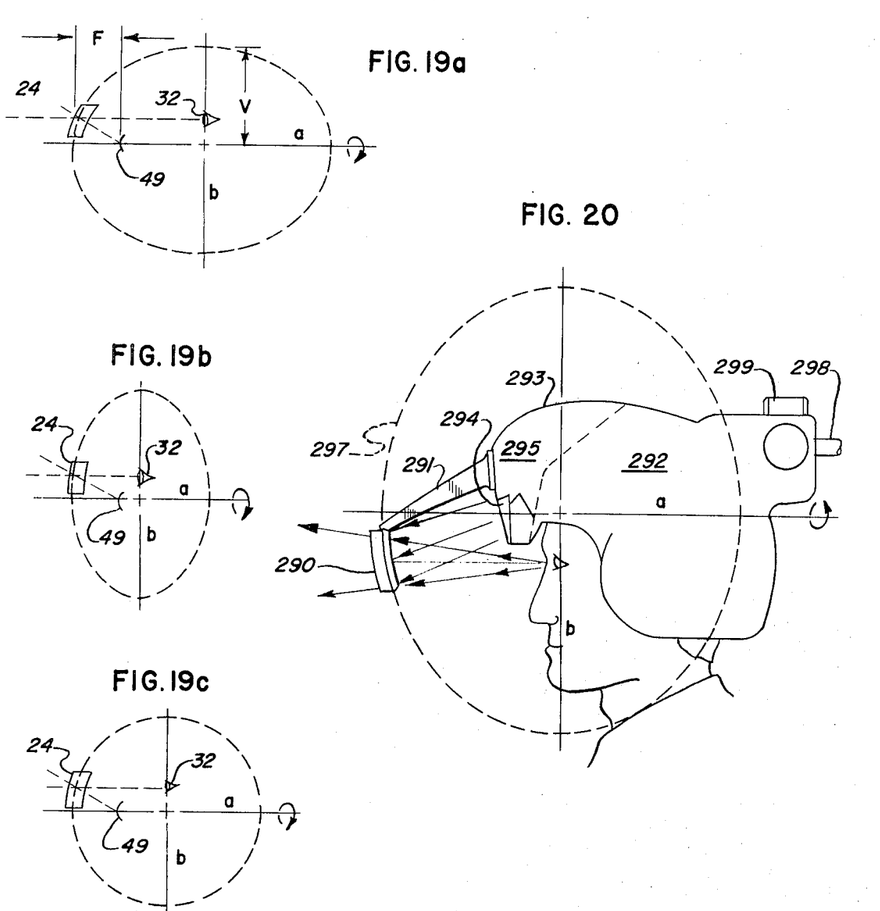
FIGS. 19a–c are a series of diagrammatic views showing the family of ellipsoids with the same optical focal length and different viewing distances.
FIG. 20 is an illustration of a helmet mounted display using a section of an oblate ellipsoid as a combiner.
Figure 20:
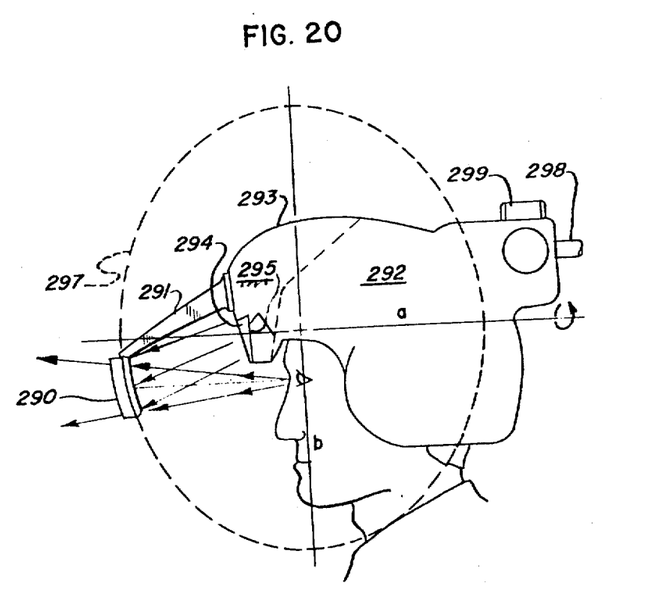

The relationship of the relative locations of the focal surface, the combiner and the viewer's eyes to the geometry of the ellipsoid is illustrated in the three diagrams A, B and C of FIG. 19. In each case the distance from the combiner 26 to the focal surface 49, the focal length F, is the same. In FIG. 19A the viewing distance D from the combiner 24 to the viewer's eye 32 is greater than two times the focal length F and the ellipsoid of revolution is of the prolate character illustrated in FIG. 4. Diagram B shows the situation where the viewing distance D is less than two times the focal length F. The combiner 24 is a section of an oblate ellipsoid, generated by revolving an ellipse about its shorter or minor axis. Diagram C illustrates the special situation where the viewing distance is of the order of two times the focal length and the surface of revolution is a sphere.

The relationships illustrated in FIG. 19 provide the basis for designing a combiner to fit the physical requirements of a particular display installation. In the usual situation the viewing distance D and the focal length F of the system will be determined by the physical limitations of the vehicle in which the display is mounted. The viewing distance $D$ is one-half the length of the horizontal axis $a$ of the ellipsoid. The radius of curvature of the combiner is approximately equal to two times the focal length. The dimension $V$, one-half the vertical axis $b$ of the ellipsoid, is determined by the relationship $$V = \sqrt{RD}$$

Thus, the geometric characteristics of the ellipse for generating a combiner for optimum two-eye viewing are determined by the viewing distance and focal length of the system.

In order to display images which are clearly focused, the display apparatus has means for generating images in the focal surface 54 for the ellipsoidal mirror. The generating means has both means for generating a bar image and means for generating a scale image in the focal surface.

Figure 12:
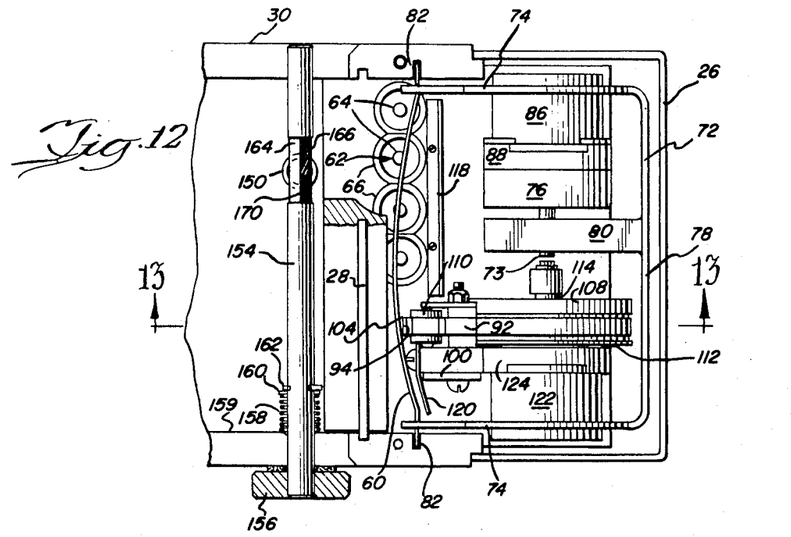
FIG. 12 is a fragmentary plan view of the generating means in the housing.
Figure 13:
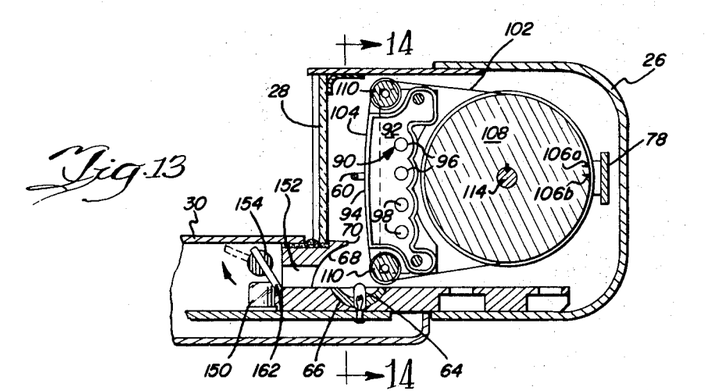
FIG. 13 is a fragmentary sectional view taken along the line 13—13 of FIG. 12.

As illustrated in FIGS. 8, 11, 12 and 14, an elongated bar 60 is positioned transverse to the face of mirror 24. An elongated lamp source generally designated 62 is positioned in the lower part of housing 26 and aligned with the bar 60. The elongated lamp source has a plurality of lamps 64 aligned in a row, with each of the bulbs 64 having a lower spherical reflector 66 to reflect light from the lamps 64 toward the bar 60. In addition, the housing 26 has a curved reflecting surface 68, as best shown in FIG. 13, extending substantially the length of light source 62 to reflect light, which is directed in front of the bar, back onto reflectors 66 to increase illumination. The edge of reflecting surface 68 is cut off at 70 to permit passage of light from the lamps 64 and reflectors 66 to the bar 60. Light from lamp source 62 is reflected by the bar 60 onto the mirror 24, and the shape of the bar or reflective element defines the shape of a transverse bar image on the mirror.

Figures 10, 11, 17:
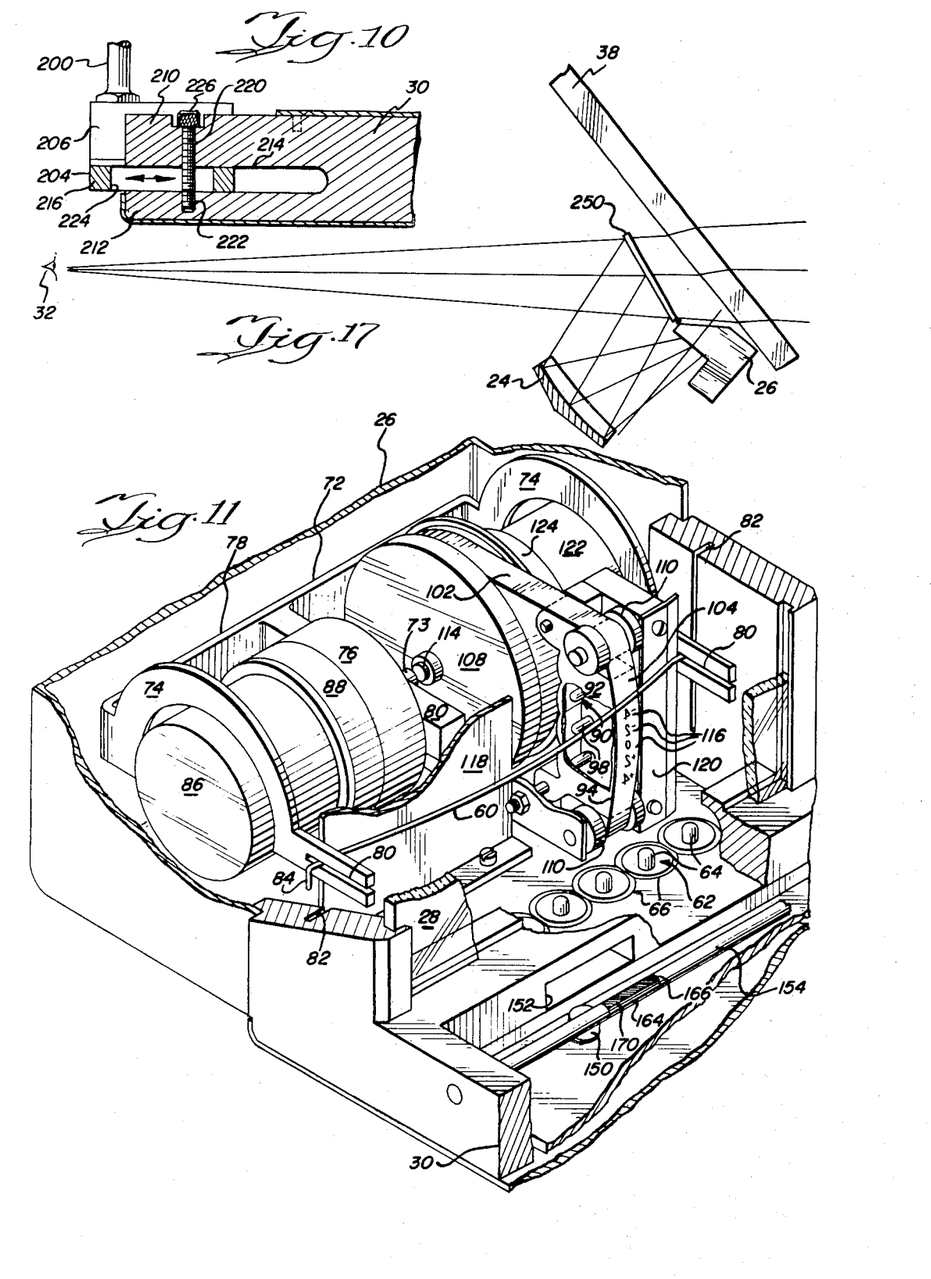
FIG. 10 is a fragmentary sectional view taken along the line 10—10 of FIG. 7, showing the slidable mirror mounting.
FIG. 11 is a perspective view of the generating means with the housing partly broken away.
FIG. 17 is a side elevational view of another embodiment of the present invention.

A fork member 72 has a pair of spaced arms 74 extending forwardly in the housing to hold the bar 60 transverse to the mirror. A torque motor 76 is positioned in the housing behind the bar 60, and has a rotatably driven shaft 73. The fork member 72 has a portion 78 connecting the arms 74 and a drive arm 80 intermediate to arms 74 which extends inwardly from connecting portion 78 and which is connected to the shaft 73. The motor 76 pivotally drives the fork member 72 about shaft 73 to move the bar 60 vertically in the focal surface within the illumination of the lamp source 62.

Each of the arms 74 has a slot 80 adjacent its ends which are aligned with each other to slidably receive the bar 60. The slots 80 permit sliding movement of the bar relative to the face of the mirror when the bar is moved throughout the range of positions above the lamp source 62.

A pair of aligned channels 82 are opposed to each other on the inside of the housing 26. The channels 82 receive the ends of the bar to guide movement of the bar relative to the face of the mirror when the bar is moved throughout the range of positions. The channels 82 or guide means are used to maintain the bar, as near as practical, within the focal surface of the mirror 24 when the bar is moved vertically. Accordingly, the straight channels 82 are aligned in a plane tangent to the focal surface at the major axis of the mirror and guide the bar in an upright plane, with the lamp source aligned with and adjacent to the upright plane.

Since the ellipsoidal mirror has a single curved focal surface for both eyes, as described in connection with FIG. 5, the bar 60 is curved in a surface drawn generally at right angles to the mirror to conform to the curved focal surface. The bar 60 has downturned end portions 84 received in channels 82 to restrain the bar against rotation and maintain the curve of the bar at right angles to the mirror.

Thus, the channels 82 guide movement of the bar in an upright plane which is generally aligned with the face of the mirror, while the slots 80 allow movement of the bar relative to the face of the mirror for different pivotal positions of fork member 72, in order that the channels 82 can maintain the bar in the upright plane. The upright plane approximates the shape of the focal surface vertically above lamp source 62, and the bar is curved to conform to the horizontal shape of the focal surface. When the bar is moved in the upright plane, the corresponding bar image is vertically displaced relative to the mirror as the result of the angle at which the light rays from the bar are reflected from the mirror, as illustrated in FIG. 8.

A potentiometer 86 is associated with the bar motor 76, and has a shaft (not shown) pivotally connected to the motor 76 in order to determine the actual position of the motor shaft 73 and the vertical position of the bar 60. An amplifier 88 for the motor 76 is positioned intermediate the potentiometer 86 and the motor. The functions of both the potentiometer 86 and amplifier 88 are discussed in greater detail below.

As illustrated in FIGS. 11, 12, 13 and 14, the scale generating means has a light source generally designated 90 positioned in a translucent tape guide 92, with the tape guide having an elongated shape and being positioned upright in the housing 26. The guide 92 has an elongated front guide surface 94 facing the mirror, and light is transmitted from light source 90 through the guide 92 to the front surface 94. A plurality of aligned holes 96 in one side of the guide 92 receive a plurality of lamps 98 which form the elongated light source 90. A printed circuit board 100 for the lamps 98 is mounted on one side of the guide 92.

An elongated strip of tape 102 is movably supported in the housing with a portion of the tape 104 being held in facing engagement with the front guide surface 94. The ends of the tape 106a and 106b are secured to a drive pulley 108 which is pivotally mounted in the housing behind the guide 92. A pair of guide pulleys 110 are pivotally mounted at the upper and lower ends of the tape guide 92 and adjacent the front guide surface 94, with the drive pulley 108 and guide pulleys 110 being aligned with each other. Starting at end 106a, the tape 102 passes over the drive pulley 108 and upper guide pulley 110 to the front guide surface 94, and the tape then passes over the lower guide pulley 110 and drive pulley 108 to the other end 106b.

A torque motor 112 is mounted adjacent the drive pulley 108 and has a rotatably driven shaft 114 which is secured to the drive pulley 108. The motor 112 and shaft 114 rotate the drive pulley 108 and move the tape 102 along the guide surface to modify the elongated tape portion 104 which is supported intermediate light source 90 and mirror 24.

Figure 14:
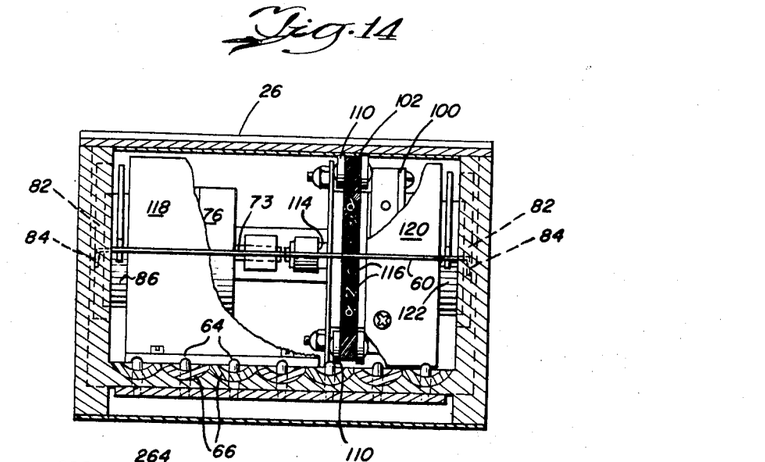
FIG. 14 is a sectional view taken along the line 14—14 of FIG. 13.

The tape 102 contains a plurality of longitudinally disposed scale indicia 116, and the light passing through guide surface 94 and the tape portion 104 defines a vertically orientated scale image 40 on the mirror as shown in FIG. 2. Consequently, movement of the tape 102 by motor 112 changes the vertical position of the scale indicia on the mirror. The tape 102 is partially transparent to define the scale indicia 116, and preferably the indicia 116 are clear to allow passage of light, while the remainder of the tape is opaque, as shown in FIG. 14.

The front guide surface is positioned in the focal surface of the ellipsoidal mirror directly behind the movable bar 60, and the guide surface 94 is curved to generally conform with the shape of the focal surface. As shown in FIG. 2, the bar image 42 intersects the scale image 40, and since vertical movement of the bar displaces the bar image 42 on the mirror, the point of intersection between the bar and scale images is also modified. Thus, the bar image is used as a pointer to indicate to the viewer a reference on the scale image at the point of intersection.

A first plate 118 extends from one side of the tape guide 92 to adjacent one of the arms 74 in front of motor 76, and a second plate 120 extends from the other side of the guide 92 to adjacent the other arm 74. Both plates 118 and 120 extend substantially the vertical distance of bar movement, and have a low reflective surface to minimize the reflection of ambient light which might produce undesirable images from the mirror.

A potentiometer 122 is associated with the scale motor 112 and has a shaft (not shown) pivotally connected to the motor to determine the actual position of the shaft 114 and tape 102. An amplifier 124 for motor 112 is positioned intermediate the potentiometer 122 and motor 112. Both the potentiometer and amplifier are discussed in more detail below. As best shown in FIG. 11, the arms 74 of fork member 72 are curved to pass over potentiometers 86 and 122.

Figure 18:
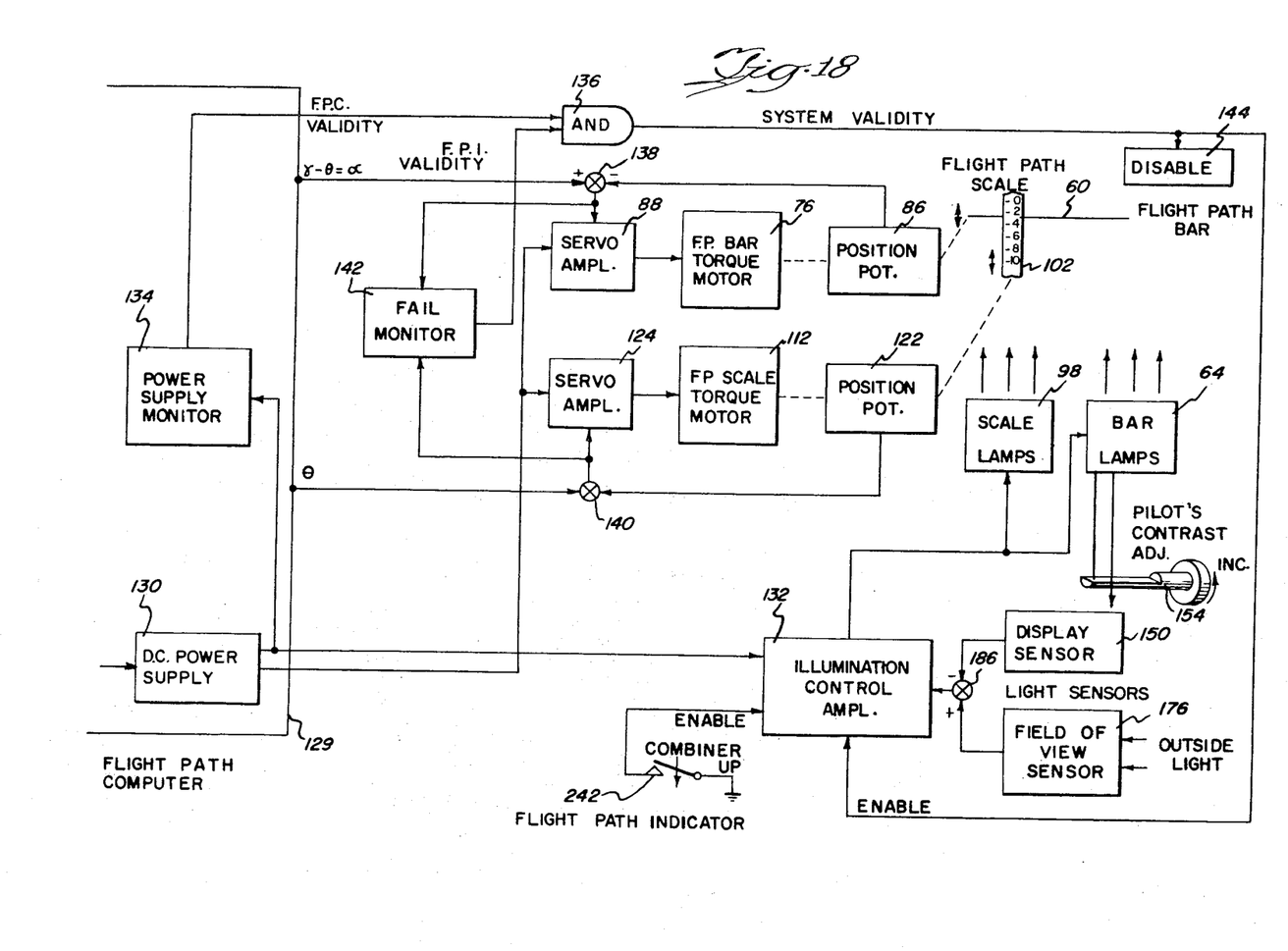
FIG. 18 is a functional block diagram of the display apparatus of this invention.

A functional block diagram of the display apparatus or flight path indicator is shown in FIG. 18. A flight path computer 129 has a DC power supply 130 which provides power for the bar servo amplifier 88, the scale servo amplifier 124, and an illumination control amplifier 132. The operation of the power supply 130 is verified by a power supply monitor 134 which establishes a flight path computer validity signal FPC for an AND gate 136.

The flight path computer processes a signal representing the aircraft angle of attack $\alpha$ which may be modified as described in the application and patent referred to above. The angle of attack signal $\alpha$ is connected to servo amplifier 88 which establishes a signal for driving the bar torque motor 76. The bar torque motor 76 moves the flight path bar 60, and potentiometer 86 measures the position of the bar motor shaft 78 and develops a signal representing the actual position of the bar 60 and image 42. The actual bar position signal is combined with the angle of attack $\alpha$ signal at summing point 138 and an error signal is established for the amplifier 88.

The flight path computer also establishes a signal representing the aircraft pitch angle $\theta$ for control of the scale tape 102 in order to compensate for the aircraft attitude and reference the zero scale indicium to the horizon. The pitch signal $\theta$ is connected to the tape servo amplifier 124, which establishes a signal for the scale motor 112. Motor 112 moves the tape 102, as previously described, and potentiometer 122 measures the position of the motor shaft 114 and develops a signal representing the actual position of the tape 102 and scale 40. The actual scale position signal is combined with the pitch signal θ at summing point 140 and an error signal is established for amplifier 124.

Both the error signals from summing points 138 and 140 are monitored by a circuit 142 and a flight path indicator validity signal FPI is established for the AND gate 136. If both the FPC and FPI validity signals are valid, the AND gate 136 establishes a signal representing valid system operation to enable or energize the illumination control amplifier 132. If either the FPC or FPI signals are invalid, the AND gate 136 removes the system validity signal to inhibit amplifier 132 and indicate to disable circuit 144 that a malfunction has occurred in the system. The disable circuit may take preventive action, such as moving the flight path bar to the upper or lower part of the housing in order to prevent undesired reflection of ambient light from the bar onto the mirror.

As illustrated in FIGS. 8, 11, 12 and 13, a photo cell or light sensor 150 is mounted in the lower part of the second base portion 30 adjacent the front end of housing 26. A channel 152 is cut into the front part of the housing 26 in front of lamp source 62 to allow passage of light from bulbs 64 into the second base portion 30. An elongated cylindrical bar 154 is rotatably mounted in the sides of the second base portion 30, with the bar 154 being generally aligned with the elongated lamp source 62. The bar 154 extends through one side of the second base portion 30, and has a knob 156 secured to the extending bar portion for rotational adjustment of the bar. A coil spring 158 encircles the bar 154 between the inner surface 159 of the second base portion 30 which is adjacent the knob 156 and a washer 160 which is retained by a pin 162. The spring 158, washer 160, and pin 162 prevent movement of the bar 154 out of the second base portion 130 and provide friction to prevent inadvertent rotation of the bar.

The bar 154 is positioned to transmit light by reflecting light passing from lamp source 62 onto light sensor 150. Adjacent the channel 152, the bar 154 has a first highreflective or light colored surface 164 circumferentially covering a 180° portion of the bar, and a second low reflective or dark surface 166 circumferentially covering the remaining portion of the bar. Since the relative amount of first and second surface areas 164 and 166 exposed to the lamp source 62 controls the intensity of light reflected from the lamp source onto the sensor 150, and since rotation of the bar modifies the relative amount of first and second surface areas exposed to the lamp source, the intensity of light reflected from the exposed areas onto the light sensor is modified by bar rotation. Thus, the first and second surfaces serve as means for reflecting light from the lamp source onto the light sensor, and rotation of the bar and the exposed first and second surface areas provide means for modifying the intensity of the reflected light.

As illustrated in FIG. 13, the pin 162 extending outwardly from the bar prevents complete rotation of the bar. In a first position, the pin or stop 162 strikes the lower part of housing 126, and in a second position it strikes the upper part of the second base portion 30 to prevent pivotal movement past these points. Intermediate the first and second pivotal stop positions, a border area 170 between the first and second surface areas 164 and 166 is exposed to lamp source 62.

Figure 9:
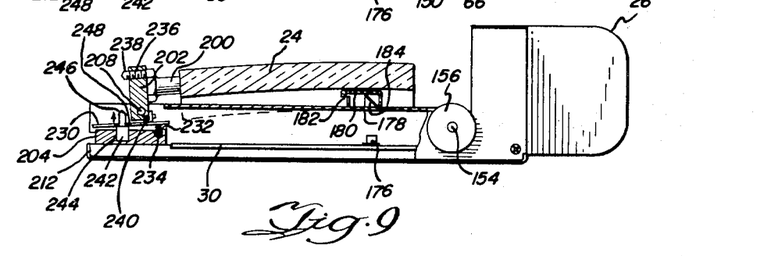
FIG. 9 is a side elevational view taken partly in section along the line 8—8 of FIG. 7, with the mirror folded to a stow position.

As illustrated in FIGS. 8 and 9, a photo cell or light sensor 176 is mounted in an aperture 178 in the upper surface of second base portion 30 and in front of sensor 150. A cylindrically shaped hood 180 is mounted over aperture 178 on top of the second base portion 30 and has a front opening 182 facing the mirror 24. A mirror 184 is angularly positioned at the rear of and inside the hood 180 above aperture 178 to reflect ambient light received through opening 182 onto light sensor 176. Since the light is received from the direction of the mirror 24, the light intensity sensed by sensor 176 is representative of lighting conditions for the view through the mirror 24.

As illustrated in FIG. 18, the display sensor 150 measures the intensity of bar lamps 64 and establishes a signal representing the intensity of the display illumination. The field of view or ambient light sensor 176 measures the intensity of the outside light and establishes a signal representing the ambient light conditions for the view through the mirror. The signals from sensors 150 and 176 are combined at summing point 186 and a contrast error signal is established for control of the illumination control amplifier 132. The control amplifier 132 is responsive to the error signal from summing point 186 to control current to the scale and bar lamps 98 and 64 in the generating means and modify the intensity of the bar and scale lamps in the direction to balance the outputs of the two sensors 150 and 176. Since the outputs of the sensors 150 and 176 represent the brightness of the display and the view through the mirror respectively, and since the outputs of the sensors 150 and 176 are maintained balanced by the control amplifier 132, the brightness of the display is maintained balanced with the lighting conditions for the view through the mirror, and a nearly constant contrast between the display and the view through the mirror is achieved.

Thus, the adjustable bar 154, or means for adjusting light from the lamp source 62 to the display sensor 150, serves to adjust the brightness of the display required to effect a balance of the sensor signals so that the adjustable bar 154 provides an adjustment of the degree of contrast between the display and the view through the mirror.

Continuing now to the manner in which the mirror 24 is mounted to the base 30, as illustrated in FIGS. 6, 7, 8 and 9, the mirror has a lower pair of space threaded bores (not shown) to receive a pair of aligned posts 200 having threaded ends. The posts 200 are mounted on a rectangular shaped support bar 202, and an elongated support member 204 has a pair of upright flanges 206 which are sufficiently spaced to receive the support bar 202 intermediate the flanges 206. The support bar 202 has a pair of aligned pivot pins 208 extending longitudinally from its ends. The flanges 206 have a pair of aligned apertures (not shown) to pivotally receive pins 208 and permit pivotal motion of the support bar 202 relative to support member 204.

An upper arm 210 extends forwardly from the second base portion 30 on both sides, and the pair of arms 210 are spaced from a lower extension 212 of the second base portion 30, with the arms 210 and lower extension 212 defining the end of second base portion 30.

The spacing between arms 210 and extension 212 define a pair of slots 214 to slidably receive the ends 216 of support member 204.

Thus, the support member 204 is held in position in slots 214 while the mirror and support bar 202 pivot in support member 204. Accordingly, the pivotal mounting means permits folding of the mirror 24 between an upright position, as illustrated in FIG. 8, with the mirror displaying images which are generated in the housing 26, and a stow position, as illustrated in FIG. 9, with the images removed from the mirror. In the stow position, the mirror is folded to a position intermediate the pivotal axis and the generating means in housing 26 when the mirror is not in use.

As illustrated in FIG. 10, a bore 220 extends through both of the upper arms 210, and a pair of lower threaded bores 222 are aligned with upper bores 220 in the lower base extension 212. Both ends 216 of support member 204 have an elongated aperture 224 aligned with the upper and lower bores 220 and 222 when the support member is received in slots 214. A pair of bolts 226 extend through upper bores 220 and apertures 224, and the ends of bolts 226 are received in the bores 222. The upper arms 210 have sufficient flexibility to engage flanges 216 when the bolts 226 are tightened. Thus, support member 204 is moved relative to the housing 26 with the support member ends 216 sliding in slots 214, and the bolts 226 are tightened to lock the support member 204 and mirror at a desired position. When the mirror is in the upright position, the mirror adjustment means permits movement of the mirror toward and away from the generating means in the housing to locate the generating means in the focal surface of the ellipsoidal mirror.

As illustrated in FIGS. 8 and 9, an elongated pressure plate 230 is positioned intermediate support member 204 and support bar 202. A coil spring 232 or spring means has one end received in a depression 234 in the upper surface of support member 204, and urges the plate 230 against the surfaces of support bar 202 from below. When the mirror is in the upright position, spring 232 extends and urges plate 230 against the lower surface of bar 202, and when the mirror is in the stow position spring 232 is compressed and plate 230 is urged against the front surface of bar 202. Thus, the spring 232 and pressure plate 230 serve as means for detent engagement of the support bar and for holding the mirror in a selected pivotal position.

A threaded bore 236 extends through support bar 202 and receives an adjustable screw 238. The end of screw 238 extends past the lower surface of support bar 202 and engages plate 230 when the mirror is in an upright position. Accordingly, the screw 232 provides means to vary the upright position of the mirror about the pivotal axis of the pivotal mounting means. An angle plate 240 which is secured to the front of support bar 202 engages plate 230 and serves as a stop when the mirror is folded to the stow position.

A switch 242 is received in an upper recession 244 in support member 204, and has an upwardly biased button 246 extending through an aperture 248 in plate 230. When the mirror is in the upright position, as shown in FIG. 8, the button 246 is pressed downwardly into switch 242 and a contact is closed in the switch. When the mirror is folded to the stow position, as shown in FIG. 9, the button 246 is biased out of switch 242 to open the contact in the switch. As illustrated in FIG. 18, when the combining mirror 24 is up the switch 242 is closed in order to enable or energize the illumination control amplifier 132, and when the combiner is down switch 242 is opened and amplifier 132 is inhibited. Accordingly, when the combiner is up, the control amplifier 132 or circuit means is closed to energize lamps 64 and 98, and when the combiner is down, the circuit means is opened to de-energize the lamps. Thus, the switch 242 serves as means operably associated with the pivotally mounted mirror to energize the generating means when the mirror is in the upright position and to de-energize the generating means when the mirror is in the stow position and not in use.

In another embodiment of the present invention, as illustrated in FIG. 17, the ellipsoidal mirror 24 collimates the images generated in housing 26 and reflects the collimated images onto a second mirror 250. The second mirror 250 is partially reflective and positioned in the line of vision of the operator's eyes 32, and the reflected images from mirror 250 are combined with the view through mirror 250. In this embodiment, the light rays are reflected back by mirror 24, and permits a relatively compact display unit for certain cockpit configurations where space is at a premium.

Figures 15, 16:
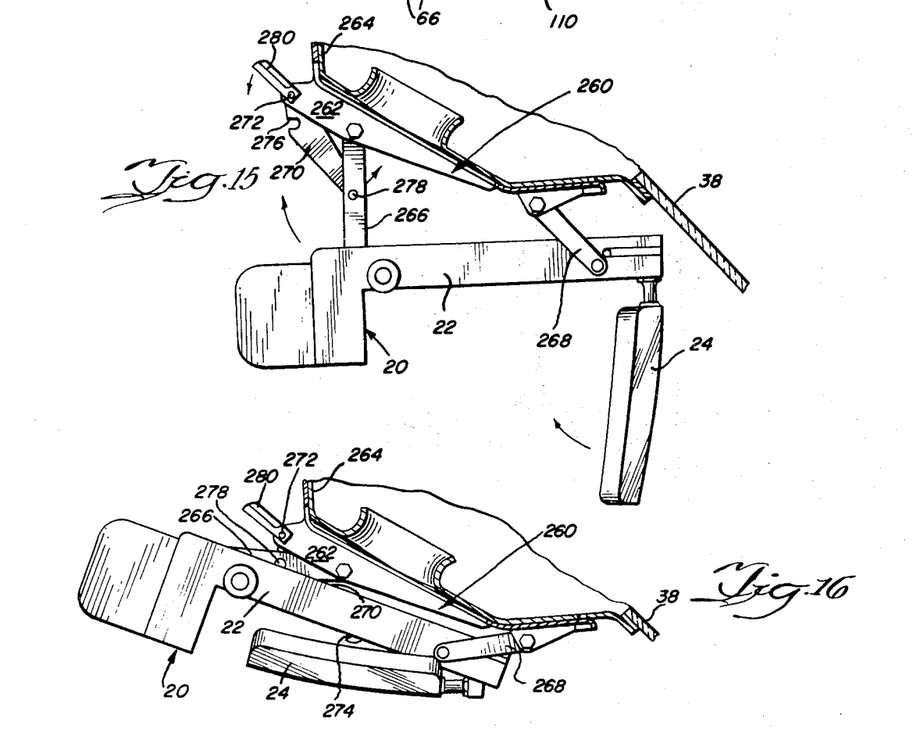
FIG. 15 is a side elevational view of the support device of this invention, with the display apparatus pivoted to a viewing position.
FIG. 16 is a side elevational view of the support device with the display apparatus pivoted to a position with the mirror removed from the operator's normal line of vision.

In FIGS. 15 and 16, a support device, generally designated 216, is shown for mounting the display apparatus 20 in a vehicle, such as an aircraft. A bracket 262 is secured to the vehicle, and preferably to the overhead 264 of the vehicle adjacent the windshield 38. A first link arm 266 pivotally connects one side of the base 22 to bracket 262, and a pair of spaced second link arms are pivotally connected to the bracket 262 and both sides of the forward end of base 22. The arms 266 and 268 or linkage means pivotally secures the base 22 to bracket 262 for movement of the display between a viewing position with mirror 24 interposed in the normal line of vision of the vehicle operator, and a position with the mirror removed from the operator's normal line of vision. The means pivotally mounting the mirror 24 to base 22 permits the mirror to be folded to the stow position, as illustrated in FIG. 16, with the images removed from the mirror. Thus, the display apparatus may be conveniently removed from its operative position when not in use, and does not utilize space in the aircraft instrument panel.

An elongated locking member 270 is pivotally secured to the rear end of bracket 262 by a pin 272. Locking member 270 has a first opening 274 adjacent its end, and a second opening 276 adjacent pin 272. When the display apparatus is pivoted to the viewing position, a locking post 278, which extends outwardly from arm 266 intermediate bracket 262 and base 22, is received in the first opening 274 to lock the display in position. A release tab 280 is secured to pin 272 and when the tab 280 is pulled downwardly, the locking member is moved upwardly and the post 278 is disengaged from opening 274, releasing the display and permitting it to be pivoted toward the overhead 264. When the display is positioned adjacent the overhead, the post 278 is received in opening 276 to lock the display in position with the mirror removed from the operator's normal line of vision. The tab 280 is pulled downwardly to move locking member 270 upwardly and disengage opening 276 and post 278, and the released display may be pivoted to the viewing position.

A combiner with a viewing distance less than two times the focal length, developed from the oblate ellipsoid of FIG. 19B, is illustrated in FIG. 20. The combiner 290 is mounted on a support arm 291 secured to the front of the viewer's helmet 292. Support arm 291 extends forwardly and downwardly from the forehead covering portion of the helmet and the combiner 290 extends downwardly from the front of the support arm, being positioned in front of and generally in the same horizontal plane with the viewer's eyes. The image generating apparatus is located in a compartment 293 in the forward top portion of the helmet. The image to be displayed is projected through a window 294 from the focal surface 295 to the combiner 290. The outline of the oblate ellipsoid is indicated by the broken line 297.

A cable 298 connects the image generating apparatus with a suitable source of electrical power and image generating signals located elsewhere in the vehicle.

Figure 21:
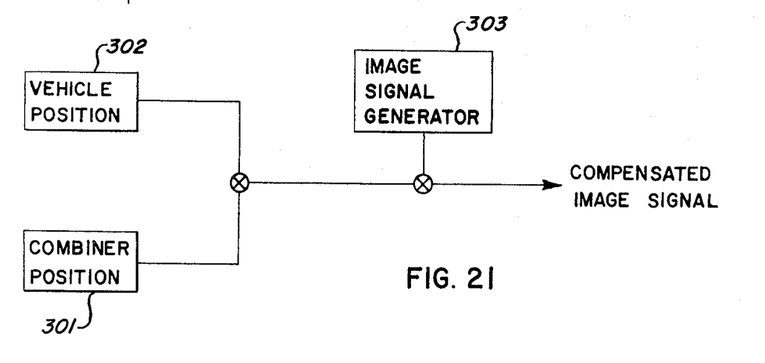
FIG. 21 is a block diagram of a means for compensating the generated image signal for the position of the helmet of FIG. 20.

The combiner 290 does not have a fixed position with respect to the frame of the vehicle, as is the case with the displays shown in FIGS. 1 and 15. A position sensor 299 mounted on the helmet provides signals representing the angular position of the helmet with respect to the pitch and roll axes of the vehicle which shift the display position to cancel the effects of head position. For example, as shown schematically in FIG. 21, position signals from a gyroscope 301 mounted on the helmet may be compared with position signals from a gyroscope 302 mounted on the vehicle to modify the image signals from generator 303, correcting the bar and pitch scale displays for the position of the helmet with respect to the vehicle.

The foregoing detailed description has been given for clearness of understanding only and no unnecessary limitations should be understood therefrom as modifications will be obvious to those skilled in the art.

I claim:

1. A collimated head-up display apparatus for a vehicle, presenting a display of visual information to a viewer against a background of the outside world, comprising:
    a reflective surface which is a segment of an ellipsoidal surface, said ellipsoidal surface being a surface of revolution of an ellipse about one of its axes, said reflective surface being taken substantially from one hemiellipsoidal surface adjacent but offset from said axis of revolution, which axis constitutes the optical axis of said reflective surface, said reflective surface having a nominal viewing position generally on the axial plane of the ellipsoid at right angles to the optical axis, said viewing position being offset from the optical axis with the line of sight from the viewing position to the reflective surface being generally parallel with but offset from the optical axis; and
    means for generating an image of the visual information for display on said reflective surface, said means forming the image about the optical axis of and at the focal surface of said reflective surface, out of the line of sight between the viewing position and the reflective surface.

2. The collimated head-up display of claim 1 wherein the distance from the reflective surface to the viewing position is greater than two times the distance from the reflective surface to the focal surface.

3. The collimated head-up display of claim 1 wherein the distance from the reflective surface to the viewing position is less than two times the distance from the reflective surface to the focal surface.

4. The collimated head-up display of claim 1 wherein the distance from the reflective surface to the viewing position is substantially equal to the distance from the reflective surface to the focal surface.

5. The display apparatus of claim 1 wherein said reflective surface is semi-transparent and is positioned in the line of sight of the viewer, and the collimated image is combined with the view through the semitransparent reflective surface.

6. The display apparatus of claim 1 including a planar, semi-transparent mirror positioned in the line of sight of a viewer to reflect the collimated image from said reflective surface to the viewer, combined with the view through said mirror.

7. The display apparatus of claim 1 wherein the optical axis is the major axis and the ratio of major to minor axis of said ellipse is of the order of 4:3.

8. The display apparatus of claim 1 wherein the viewing position is spaced from the optical axis approximately 0.135 times the axial dimension of the ellipse at right angles to the optical axis.

9. The display apparatus of claim 7 wherein said major axis is approximately 40 inches and said minor axis is approximately 30 inches the reflective surface has a generally spherical focal surface having a radius of the order of 4 inches with the focal surface being spaced approximately 6 inches from the reflective surface, and the reflected image is viewed at approximately 20 inches from the reflective surface, with the eyes spaced approximately 2 inches from the major axis.

10. The display apparatus of claim 1 wherein the image generating means includes,
    illuminating means;
    an elongated bar positioned generally parallel to the reflective surface to reflect light from the illuminating means and define an image of the bar on the mirror;
    means moving the bar reflective to the optical axis to modify the angle at which the image is viewed relative to the background and the optical axis.

11. The display apparatus of claim 1 including, a base, a housing at one end of the base with said image generating means therein, and a reflective surface support member slidably mounted at the other end of said base for movement toward and away from the image generating means.

12. The display apparatus of claim 1 including a base; a housing at one end of the base with said image generating means therein, and a reflective surface support member pivotally mounting the reflective surface on the base for movement between an upright position with the reflective surface displaying the generated image and a stow position.

13. The display apparatus of claim 12 including adjustable stop means to vary the upright position of the reflective surface about the pivotal axis of the mounting means.

14. The display apparatus of claim 12 including,
    circuit means selectively energizing said generating means; and
    switch means operably associated with said pivotally mounted reflective surface to close the circuit means and energize the generating means when the reflective surface is in the upright position and to open the circuit means and deenergize the generating means when the mirror is in the stow position.

15. The display apparatus of claim 12 in which the reflective surface folds to a stow position intermediate the pivotal axis and the generating means.

16. The display apparatus of claim 15 in which said base includes, a housing portion containing said generating means and having a front window through which said image is directed toward the reflective surface; and a second portion extending forwardly from the housing below said window, with said reflective surface being pivotally mounted to the second portion adjacent the end remote the window and folding to a stow position intermediate said remote end and the window.

17. The display apparatus of claim 12 including a support bar for the reflective surface pivotally mounted on the base, and means for detent engagement of the support bar to hold the reflective surface in a selected pivotal position.

18. The display apparatus of claim 17 in which said engagement means comprises, a pressure plate movably positioned adjacent said support bar; and spring means urging said plate against the bar.

19. The collimated head-up display of claim 1 wherein said reflective surface is mounted on and movable with the head of the viewer, said image generating means including means compensating the image for the position of the viewer's head with respect to the vehicle.

20. The collimated head-up display of claim 19 including means for generating a signal representing the image to be displayed, means for determining the vehicle position, means for determining the combiner position, and means for comparing the two positions and for generating a signal which compensates the image signal for the combiner position.

21. The collimated head-up display of claim 19 in which said reflective surface is mounted on a helmet worn by said viewer, and in which the image generating means is also mounted on and movable with said helmet.

* * * * *

UNITED STATES PATENT AND TRADEMARK OFFICE
CERTIFICATE OF CORRECTION

PATENT NO. : 3,816,005
DATED      : June 11, 1974
INVENTOR(S) : ROBERT R. KIRSCHNER It is certified that error appears in the above-identified patent and that said Letters Patent are hereby corrected as shown below:

Column 5, line 60, change "$\gamma = \Delta + \theta$" to -- $\gamma = \alpha + \theta$ --.

Column 5, line 63, change "$\Delta$" to -- $\alpha$ --.

Column 13, line 59, change "recession 244" to -- recess 244 --.

Column 16, line 5, (claim 4, line 3) after "to" insert -- two times --.

Column 16, line 41, (claim 10, line 8) change "reflective" to -- relative --.

Figure 20, delete the underlining of reference numeral 295 and add a lead line indicating the focal surface for combiner 290.

Signed and Sealed this

Fourteenth Day of September 1976

[SEAL]

Attest:

RUTH C. MASON
Attesting Officer

C. MARSHALL DANN
Commissioner of Patents and Trademarks

FIG. 20